(12) United States Patent
Bowman

(10) Patent No.: US 7,688,562 B2
(45) Date of Patent: Mar. 30, 2010

(54) STATUS RELAY INCLUDING A CURRENT SWITCH

(75) Inventor: Marc Bowman, McMinnville, OR (US)

(73) Assignee: Veris Industries, LLC, Portland, OR (US)

( * ) Notice: Subject to any disclaimer, the term of this patent is extended or adjusted under 35 U.S.C. 154(b) by 131 days.

(21) Appl. No.: 11/156,095

(22) Filed: Jun. 17, 2005

(65) Prior Publication Data
US 2006/0012933 A1 Jan. 19, 2006

Related U.S. Application Data

(60) Provisional application No. 60/588,610, filed on Jul. 15, 2004.

(51) Int. Cl.
H02H 3/08 (2006.01)
H02H 9/02 (2006.01)

(52) U.S. Cl. .................................................. 361/93.6
(58) Field of Classification Search ................. 361/93.6
See application file for complete search history.

(56) References Cited

U.S. PATENT DOCUMENTS

| 4,245,184 | A | * | 1/1981 | Billings et al. ............... 323/235 |
| 4,333,122 | A | * | 6/1982 | Hayden et al. ............... 361/114 |
| 4,685,022 | A | * | 8/1987 | Nichols et al. ................ 361/44 |
| 5,808,846 | A | * | 9/1998 | Holce et al. ................ 361/93.6 |
| 6,104,583 | A | * | 8/2000 | Wynn et al. .................... 361/7 |
| 6,437,954 | B1 | * | 8/2002 | Harr ............................ 361/45 |

* cited by examiner

Primary Examiner—Stephen W Jackson
Assistant Examiner—Scott Bauer
(74) Attorney, Agent, or Firm—Chernoff, Vilhauer, McClung & Stenzel

(57) ABSTRACT

Low current electrical devices can be protected by a status relay having an active current sensing circuit that includes a current switch.

11 Claims, 3 Drawing Sheets

STATUS RELAY INCLUDING A CURRENT SWITCH

CROSS REFERENCE TO RELATED DOCUMENTS

The present application claims the benefit of U.S. Provisional Application No. 60/588,610, filed Jul. 15, 2004.

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to a monitoring device for sensing and controlling the operational status of low current devices and, more particularly, to a status relay incorporating a current switch in a sensing circuit.

Many industrial environments use large numbers of electrical devices that, individually, draw very limited amounts of current, often only a small fraction of an amp. However, these devices, such as small fan motors, can be very important to the successful completion of a process that may involve costly or hazardous equipment or materials. Typically, the operation of the various remotely located devices powering complex industrial processes and machinery is monitored and controlled from a central control. A protection device or status relay, including a fault detection mechanism, monitors the operational status of the remote device and transmits a signal to the central control if the operation of the device changes in a significant manner. The fault detection signal may be displayed on a control panel to inform a human operator permitting the operator to respond to changes in the operation of the device. The fault detection signal is also commonly input to a controller that utilizes a logic process to determine the effect of the status change on the process, machinery, or system and provide an appropriate control signal to control the device.

Electrical circuit fault detection is commonly provided by a current sensor that is electrically coupled to a cable supplying power to an electrical device or load. The current sensor is electrically connected to the remotely located central control to provide a signal to the control that is representative of the status of the current within the cable. A relay or similar device may be interconnected between the remotely located control and the electrical device to receive a control signal from the control and, in response, selectively enable or disable power to the load or power to a signal terminal of a local device controller. The relay may function as a starter for the device if the power rating of the relay is appropriate, but may, if desired, be interconnected to a separate starter controlling power to the load.

Holce et al., U.S. Pat. No. 5,808,846, incorporated herein by reference, disclose a protection device comprising a combination current sensor and relay for monitoring current in a cable supplying power to a device and controlling the device in response to a signal from a remotely located control panel. The protection device includes a sensing transformer comprising a wire wound core. A changing current in the power cable produces a changing electromagnetic field around the cable which, in turn, induces a magnetic flux in the core of the sensing transformer. The magnetic flux in the core induces a voltage in the wire windings that is representative of the current flowing in the power cable. Thus, the power cable is the primary winding and the wire winding is the secondary winding of the sensing transformer. The wire winding is electrically connected to an input circuit that converts the voltage signal received from the secondary winding of the sensing transformer to an output signal representative of the current flowing in the power cable. The output signal is transmitted to a control panel and analyzed to determine if the device is to be disabled or enabled. The control panel transmits an appropriate signal to a switch circuit, typically comprising a triac or relay, which responds to the signal from the control panel by shorting or isolating electrical terminals in series with the controlled device.

While the protection device disclosed by Holce et al. is compact and easy to install, it functions best with devices that draw substantial current. The current sensing input circuit is powered by energy sourced from the power cable through the wire winding of the sensing transformer. If the power cable current level is low, the energy required to power the passive input circuit is sufficient to make measuring of the current to the load unreliable. Further, a minimum current of approximately 0.25 amps is required to generate sufficient flux to power the input circuit. The current draw of many electrical devices, including fractional horsepower motors, is insufficient for reliable sensing with this type of sensing circuitry. What is desired, therefore, is a protection device for electrical devices or loads that operate at low current levels.

DETAILED DESCRIPTION OF THE INVENTION

Figure 1:
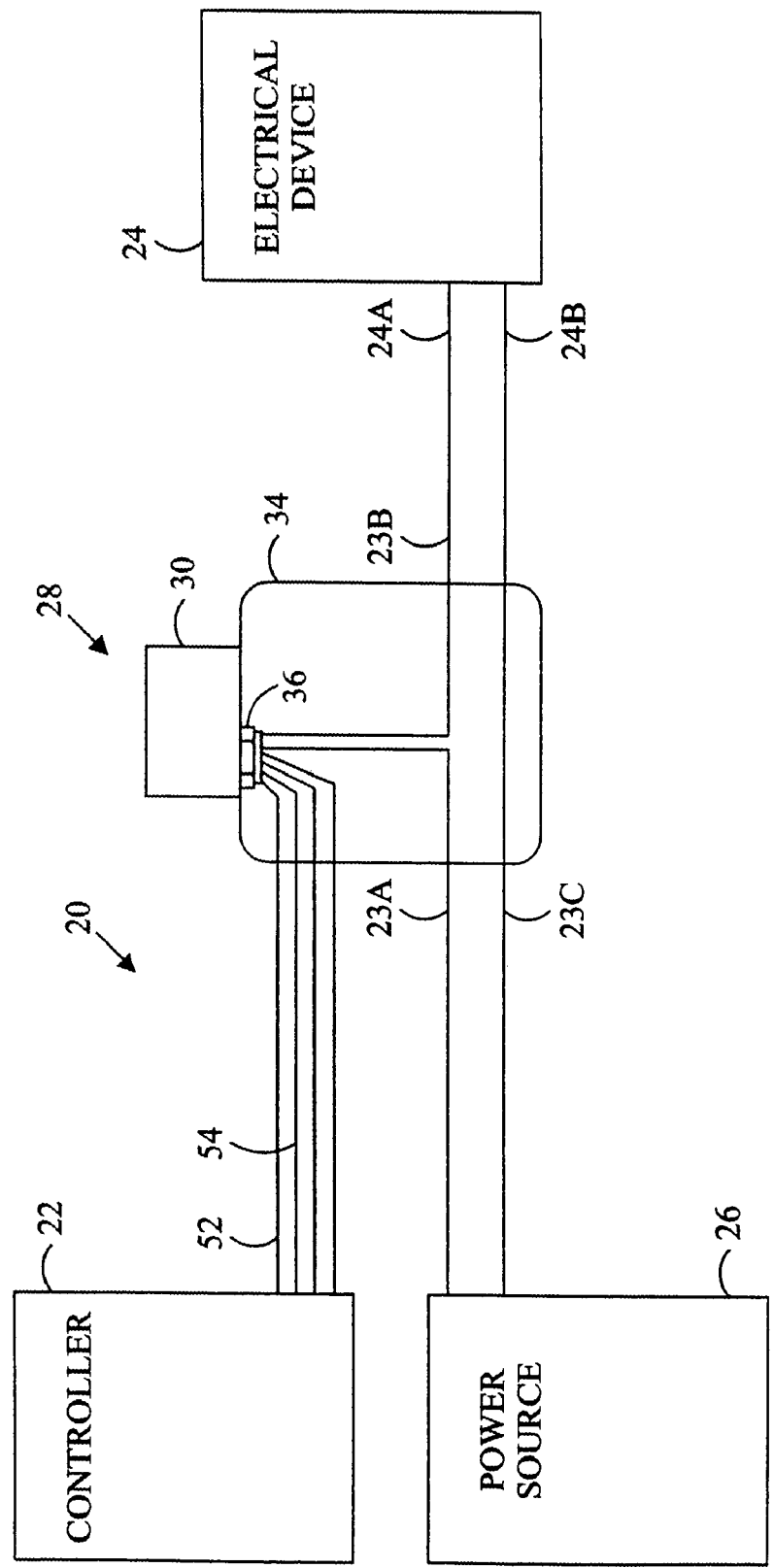
FIG. 1 is a schematic representation of an electrical circuit including a status relay controlling the operation of an associated electrical device or load.

Referring in detail to the drawings where similar parts of the invention are identified by like reference numerals and referring more particularly to FIG. 1, an electrical system 20 includes a central controller 22 that may permit manual and/or automatic control of several associated electrical devices, including the exemplary device or load 24. One type of central controller is generally known as a programmable logic controller, such as the Allen Bradley brand programmable logic controller sold by Rockwell Automation Inc. A programmable controller typically utilizes a digital computer to determine the effects on the entire system 20, or a portion of the system, of enabling or disabling an associated electrical device. By way of examples, associated electrical devices may include motors driving pumps or fans, valves, generators, switches, lights, etc. The electrical system 20 also includes a protection device or status relay 28 to monitor the operation of the electrical device 24 and signal the controller 22 of a change in the operation of the device. The monitoring device 28 also includes a switching mechanism to enable or disable the operation of the electrical device 24 in response to an input from the controller 22.

Figure 2:
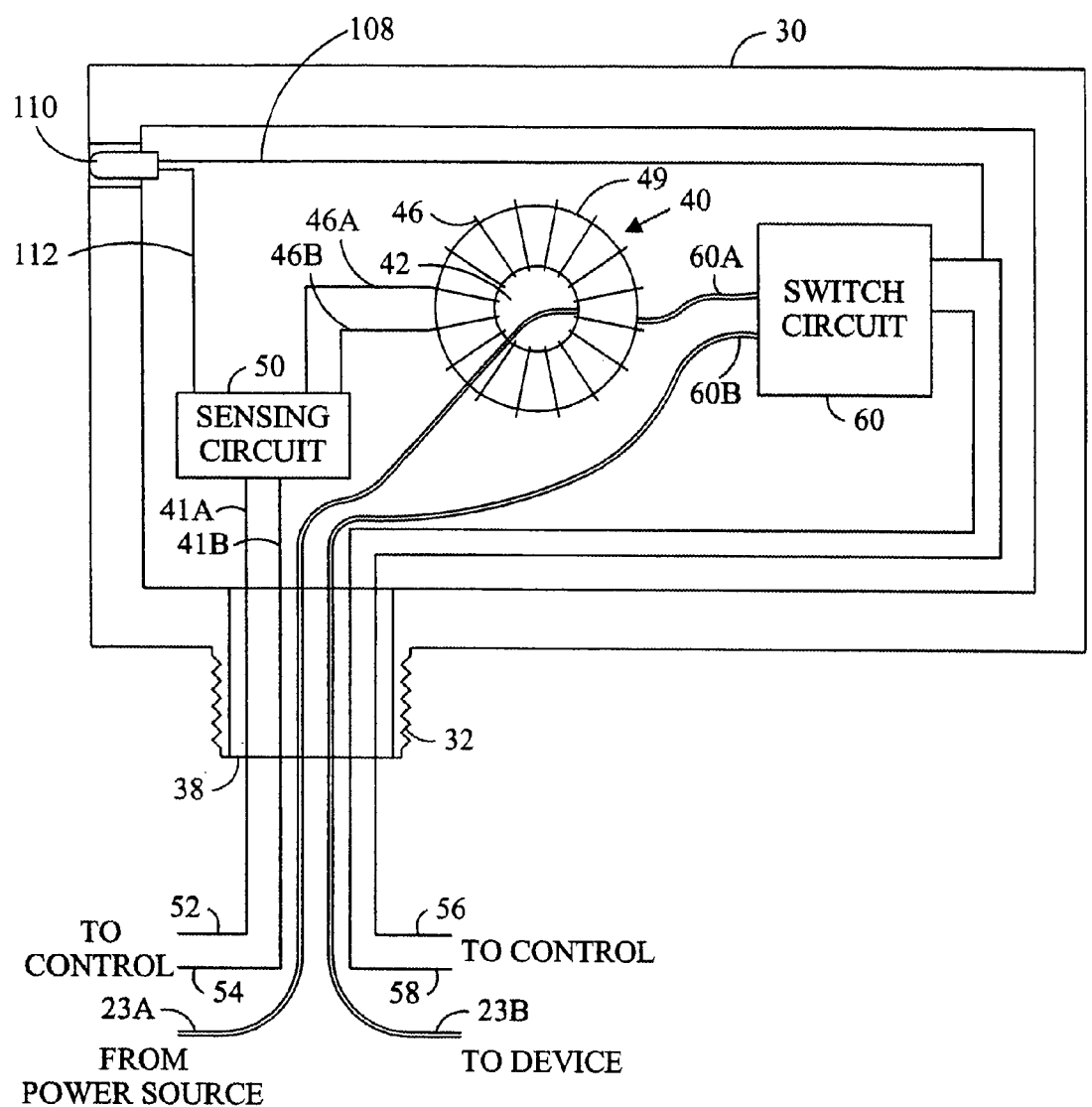
FIG. 2 is a pictorial representation of a single unit status relay illustrating the sensing transformer, sensing circuit, and switching circuit.

Referring to FIG. 2, the monitoring device 28 includes a sensing transformer 40, a sensing circuit 50, and a switch circuit 60 that are preferably confined within a single enclosure 30. The enclosure 30 includes a threaded protrusion 32 sized for insertion in one of the knock-out apertures of an electrical junction box 34 through which the power cables connecting the protected device 24 to the power source 26 can be routed. The enclosure 30 is conveniently retained to the junction box 34 by a nut 36 that engages the threaded protrusion 32 on the opposite side of the wall of the junction box from body of the enclosure 30. By locating the transformer 40, sensing circuit 50, and switch circuit 60 proximate to one another, within a single enclosure, it is considerably easier to locate the monitoring device 28 for convenient connection to the power conductors for the protected device 24. Additionally, installing a monitoring device 28 comprising a single unit requires less installation time than installing several separate devices to perform each of the desired functions and the expense of manufacturing, packaging and shipping a single device is less than that required for separate devices. A reduction in the number of backup parts and troubleshooting time is also realized.

The threaded protrusion 32 of the enclosure 30 defines an opening 38 through which power cables 23a, 23b connecting the power source 26 to the protected device 24 may be routed. One of the power cables 23a is routed through the central aperture 42 in the toroidal sensing transformer 40 and connected to a terminal of the switch circuit 64. The sensing transformer 40 is preferably a wire-wrapped magnetically permeable toroidal core 44, normally made of iron, encircling the respective power cable. Changing current in the power cable 23a induces a changing electromagnetic field around the power cable, which in turn induces a magnetic flux in the magnetically permeable core 44 of the sensing transformer 40. The magnetic flux in the core 44, in turn, induces a voltage or transformer signal in the wire windings 46 on the toroidal core that is representative of the current in the power cable. Thus, the wire winding 46 on the toroidal sensing transformer core 44 is the secondary winding, while the power cable 23a, or a parallel shunt current divider (not shown), is the primary winding of the sensing transformer 40.

Such a sensing transformer with a core of magnetically permeable material, such as iron, generates a voltage signal reasonably accurately representative of the current in the power cable over a certain normal load range. However, iron and other magnetically permeable materials have hysteresis and other nonlinear responses to changing magnetic fields that result in a nonlinear relationship between current in the power cable and the voltage signal produced in a transformer coil having such a core. The nonlinearity of such responses is especially significant with large variations in load current and frequency. To provide a more linear measurement of power, "air core" transformers have been designed using wire wrapped on a core made of material having a low magnetic permeability, such as one of plastic or nylon. Without a magnetically permeable core, however, the transformer winding generates relatively small voltage levels in response to power cable currents. An exemplary air core transformer has the following construction: core of nylon, outside diameter of 1.375 inches, inside diameter of 1.125 inches, strip width of 0.500 inches, and a #35 AWG size wire coated with a heavy polyurethane, wound 4,000 turns as a secondary winding. Examples of circuitry suitable for use with an "air core" transformer are disclosed in U.S. Pat. No. 5,502,374, assigned to the same assignee, and incorporated herein by reference.

The ends of the secondary winding 46a and 46b of the transformer 40 are electrically connected to an sensing circuit 50. The sensing circuit 50 is designed to convert the transformer signal in the secondary winding 46 of transformer 40 to either a signal representative of the changing current in the power cable 23a or a circuit condition at the output terminals 41a and 41b representative of the changing current in the power cable. The signal or circuit condition is communicated to the controller 22 via transmission lines 52 and 54 connecting the sensing circuit 50 and the controller. For example, the signal could be a current signal, voltage signal, or some sort of frequency modulation, amplitude modulation, or digital encoding. The circuit condition, for example, could be a short circuit, open circuit, or other suitable type of condition.

The sensing circuit 50 converts the voltage signal output from the secondary winding of the sensing transformer 40 to an appropriate corresponding signal or circuit condition that is communicated to the controller 22. Holce et al., U.S. Pat. No. 5,808,846, incorporated herein by reference, disclose a protection device comprising a current sensor and relay for monitoring and controlling current in a power cable. The protection device includes a sensing transformer having a secondary winding that is electrically connected to an input circuit that converts the voltage signal received from the secondary winding to an output signal representing the current flowing in a power cable connected to the protected device. In a first embodiment of the current sensing input circuit, the secondary windings of the sensing transformer are connected to a full wave rectifier having an output connected to a variable resistance that scales the output of the rectifier to the desired range for the output signals. A second embodiment of the current sensor utilizes a plurality of diodes and a precision voltage detector to vary the state of the output terminals when a predetermined threshold level is reached in the secondary windings of the sensing transformer. In a third embodiment of the input circuit, the secondary windings of the sensing transformer are connected to a full wave rectifier having an output connected to a circuit comprising a plurality of parallel resistors and a voltage regulator to produce variable 4-20 ma signal in response to the voltage signal produced by the secondary winding.

The input circuits described by Holce et al. are passive circuits that are powered by energy that is sourced from the power cable through the secondary winding of the sensing transformer. Protection devices incorporating these input circuits are suitable for protecting electrical devices drawing currents exceeding 0.5 amps, but many devices used in industrial and other systems operate at lower current levels. At low current levels the power drawn from the power cable is sufficient to make the measurement of the magnitude of the current flowing to the protected device unreliable. Further, if the power cable current is less than approximately 0.25 amps insufficient flux is generated in the core of the sensing transformer to provide sufficient energy in the secondary windings to operate the passive input circuitry. Increasing the number of turns in the primary winding will increase the voltage ratio of the sensing transformer, but a substantial portion of the power in the cable will still be required to power the passive input circuit and an increased number of turns will require a physically larger transformer to accommodate the additional turns of wire in the aperture of the toroidal core. The present inventor concluded that an active current sensor powered by a source of energy other than the power cable would improve device monitoring for low current devices by increasing the reliability of current sensing when sensing low currents and enabling the sensing of current levels lower than can be sensed by passive sensing circuits.

Figure 3:
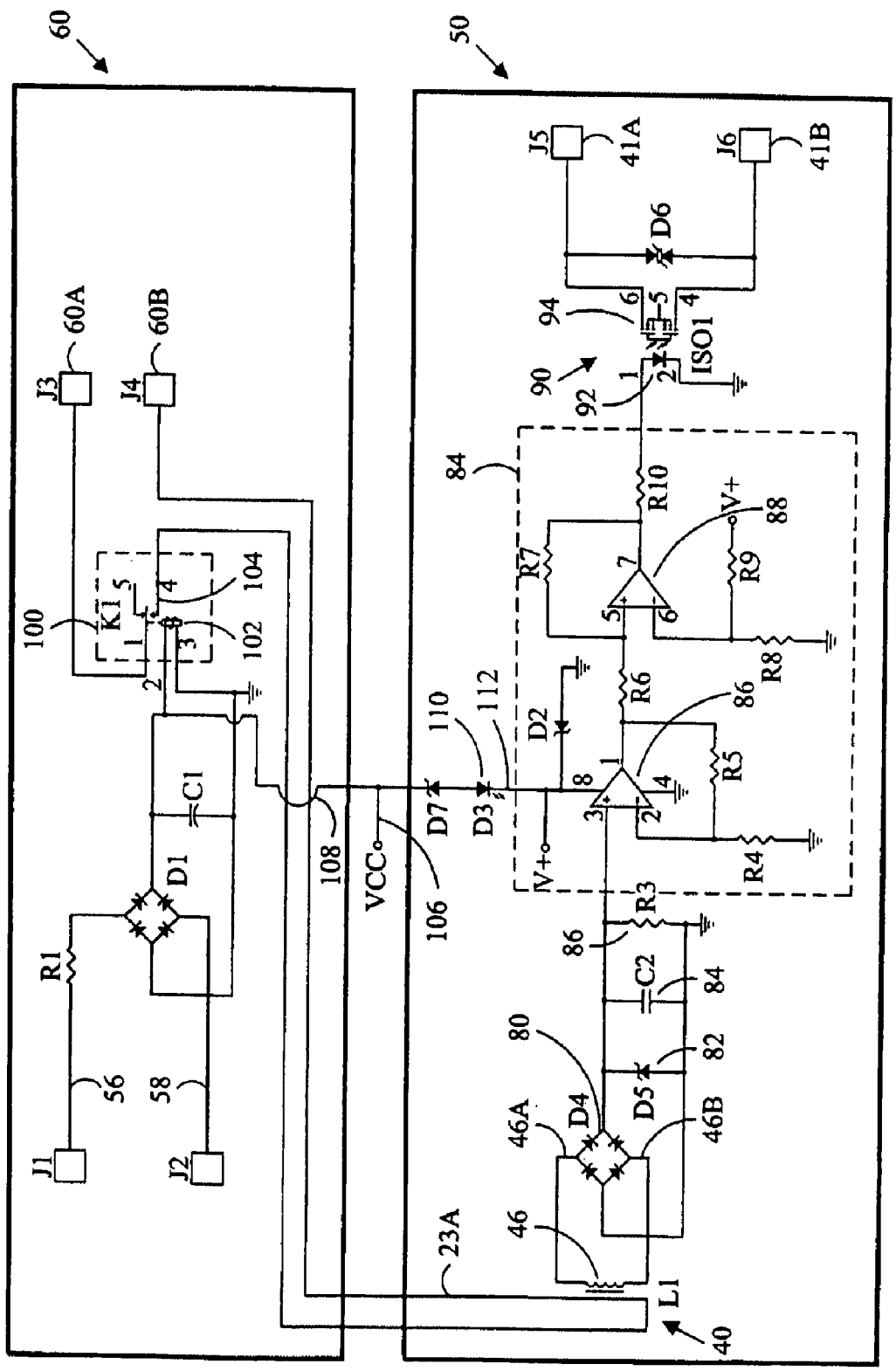
FIG. 3 is a schematic representation of a status relay including a current switch.

Referring to FIG. 3, in the monitoring device 28 the ends 46a, 46b of the secondary winding 46 of the sensing transformer 40 are connected to the input terminals of a full wave rectifier 80. A zener diode 82, capacitor 784 and resistor 86 in parallel with the output of the full wave rectifier 80 controls the voltage input to a current switch 84. The exemplary current switch 84 is an active device comprising dual operational amplifiers 86, 88. The output of the second amplifier 88 powers an LED 92 of an optical coupler 90. When the LED 92 is not illuminated, the phototransistors 94 of the optical coupler 90 do not conduct creating an open circuit between the sensor terminals 41*a* and 41*b*. When the output of the current switch 84 reaches a level sufficient to cause illumination of the LED 92, the phototransistors 94 switch to a conducting state shorting the sensor terminals 41*a* and 41*b*.

The controller 22 receives the signal from the sensing circuit 50 or determines the circuit condition of the sensing circuit 50 via the pair of signal transmission lines 52 and 54 connected to the sensor terminals 41*a* and 41*b*. For example, the signal could be a current signal, voltage signal, or some sort of frequency modulation, amplitude modulation or digital encoding. The circuit condition, for example, could be short circuit, an open circuit, or other suitable type of condition. The sensing circuit 50 can be designed and constructed in any manner, so long as it is an active device utilizing an energy source other than the power cable for the protected device and converts the transformer signal output by the sensing transformer 40 to an appropriate signal or circuit condition. The controller 22 responds to receipt of the signal or determination the circuit condition of the input circuit 50 by analyzing the signal or circuit condition to determine information such as power consumption, overcurrent, overvoltage, undercurrent, undervoltage, frequency, spikes, harmonics, etc. From this information the controller 22, among other things, may determine that the electrical device 24 should be disabled or enabled. For example, if the current sensor indicates that a motor (not shown) for a fan is malfunctioning, then the controller 22 may deactivate the motor. If deactivation of that motor would also impact another system device, such as causing overheating of a driver for pump motor, then the controller 22 may also deactivate the pump motor and other related equipment. The system controller 22 typically permits manual or automated control over the electrical system 20.

The switch circuit 60 is preferably located proximate to the sensing transformer 40 and the sensing circuit 50 in the single enclosure 30. The switch circuit 60 is electrically connected to the controller 22 by a pair of transmission lines 61 and 63. The switch circuit 60 may include any suitable switching device 100. For example, the switching device 100 may be a relay operated by a coil powered by a 24 volt AC or DC input. When a first input, a voltage, is applied to the transmission lines 56, 58 by the controller 22, the coil 102 of the exemplary switching device, relay 100, is energized closing the relay's power contacts 104 and shorting the power terminals 60*a* and 60*b* of the switch circuit 60. If the controller 22 determines that the output signal or circuit condition at the output of the sensing circuit 50 requires disablement of the device 24, the controller communicates a second input, interrupting the voltage to the transmission lines 56, 58, causing the relay power contacts 104 to open and electrically isolating the output terminals 60*a* and 60*b* of the switch circuit 60 from each other (open circuit).

A protected device or load 24 connected to the output terminals can be disabled by the opening of the circuit between the output terminals 60*a* and 60*b* and enabled by shorting the output terminals. On the other hand, the output terminals 60*a*, 60*b* can be connected to a device controller that alters the operation of the device 24 in response to the signal produced by the opening or shorting of the output terminals. In the event that the voltage applied by the controller 22 is interrupted, as a result of power failure or otherwise, the coil 102 of the relay 100 will de-energize and the power contacts 104 will open, isolating the power terminals 60*a* and 60*b* and disabling a protected device 24.

The voltage or transformer signal induced in the secondary winding 46 of the sensing transformer 40 is amplified in the active circuit of the current switch 84 of the sensing circuit 50. As a result, the sensing circuit 50 can reliably sense the transformer signal in the secondary winding 46 even when there is little current flowing in the power cable 23*a*. The monitoring device 28 including an active sensing circuit having a current switch can reliably sense power cable currents as low as 0.1 amp. In addition, since the energy to operate the sensing circuit is not sourced from the power cable, the operation of the active sensing circuit does not affect the accuracy of measuring current in the power cable.

Power for the active circuitry of the current switch 84 could be obtained from the power source 26 by a conductor 106 connecting the remote power source to a power supply terminal of the current switch 84. However, this would require additional wiring to the remotely located monitoring device 28 and would likely require additional power conditioning devices for the circuit 20. Power for the active circuitry of the current switch 84 is preferably sourced from the input to the switching circuit 60 from the controller 22. A wire 108 connects the relay coil 102 to an LED 110 and a wire 112 connects the LED to the power supply terminal of the operational amplifier 86 of the current switch 84. When the coil 102 is energized by an input from the controller 22 to enable the operation of the device 24, a voltage is applied to the LED 110 and the supply voltage terminal the current switch 84. The LED 110 illuminates to visually indicate the operating status of the status relay 28 and the current switch 84 is activated to sense current flowing to the enabled electrical device 24 through the power cable 23*a*.

The status relay 28 including an active current switch 84 can accurately respond to current levels characteristic of many smaller devices or loads that are commonly part of complex machinery and systems.

The detailed description, above, sets forth numerous specific details to provide a thorough understanding of the present invention. However, those skilled in the art will appreciate that the present invention may be practiced without these specific details. In other instances, well known methods, procedures, components, and circuitry have not been described in detail to avoid obscuring the present invention.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

The invention claimed is:

1. A monitoring device for monitoring a load current flowing to terminals of an electrical device and controlling said electrical device in response to an input from a controller, said monitoring device comprising:
   (a) a switch to enable a current flow to said electrical device in response to a first input from a controller remotely located from said monitoring device and to disable said current flow to said electrical device in response to a second input from said controller;
   (b) a transformer magnetically coupled to a conductor of said load current and producing a transformer signal indicative of a magnitude of said load current flowing in said conductor wherein said transformer and said switch are proximate one another;

(c) a rectifier to convert said transformer signal to a rectified transformer signal; and (d) a sensing circuit including an amplifier proximate said transformer and said switch, said sensing circuit operable to convert said rectified transformer signal to a state of one of a control signal and a circuit condition communicable to said controller, power for operating said sensing circuit being obtained from said first input of said controller, said first input electrically separated from said conductor of load current; said switch, said transformer, and said sensing circuit all located in a single housing, said first input and said second input not responsive to said state of said one of said control signal and said circuit condition.

2. The monitoring device of claim 1 further comprising a visual indicator of an operating status of said monitoring device.

3. The monitoring device of claim 1 wherein said power for operation of said sensing circuit is obtained from a connection confined within said single housing.

4. A monitoring device for monitoring load current flowing between terminals of an electrical device and controlling said electrical device, said monitoring device comprising:

(a) a controller arranged to receive one of a control signal and a circuit condition and transmit one of a first input and a second input;

(b) a relay including a coil connected to be energized by said first input from said controller and de-energized by said second input and a pair of contacts operable to enable a current flow to said electrical device in response to energizing of said coil and to disable said current flow to said electrical device in response to de-energizing of said coil;

(c) a transformer magnetically coupled to a power cable conducting said load current and producing a rectified transformer signal indicative of said load current flowing in said power cable; and (d) a current switch including an amplifier operable with power from said first input to convert said rectified transformer signal to a state of one of a control signal and a circuit condition representing said magnitude of said load current flowing in said power cable, one of said control signal and said circuit condition communicable to said controller, wherein said relay, said transformer, and said current switch are located proximate one another and said first input is substantially isolated from current in said power cable and not responsive to said state of said one of said control signal and said circuit condition.

5. The monitoring device of claim 4 wherein said relay, said transformer, and said current switch are confined within a single enclosure.

6. The monitoring device of claim 4 further comprising a visual indicator of an operating status of said monitoring device.

7. A monitoring device for monitoring a load current flowing between terminals of an electrical device and controlling said electrical device in response to an input from a controller, said monitoring device comprising:

(a) a switch to enable a current flow to said electrical device in response to a first input from a controller remotely located from said monitoring device and to disable said current flow to said electrical device in response to a second input by said controller;

(b) a transformer magnetically coupled to a power cable and producing a rectified transformer signal indicative of a magnitude of said load current flowing to said electrical device in said power cable; and (c) a sensing circuit operable from energy of said first input and responsive to said rectified transformer signal to a change a state of one of a control signal and a circuit condition communicable to said controller; said switch, said transformer, and said sensing circuit located proximate to one another, said first input substantially isolated from said load current and not responsive to said state of said one of said control signal and said circuit condition.

8. The monitoring device of claim 7 wherein said sensing circuit comprises an amplifier of said rectified transformer signal.

9. The monitoring device of claim 7 wherein said sensing circuit is operable to convert a rectified transformer signal produced by a load current in said power cable no greater than 0.5 amp to one of a control signal and a circuit condition.

10. The monitoring device of claim 7 wherein said sensing circuit is operable to convert a rectified transformer signal produced by a load current in said power cable no greater than 0.25 amp to one of a control signal and a circuit condition.

11. The monitoring device of claim 7 wherein said sensing circuit is operable to convert a rectified transformer signal produced by a load current in said power cable no greater than 0.11 amp to one of a control signal and a circuit condition.

* * * * *

UNITED STATES PATENT AND TRADEMARK OFFICE
CERTIFICATE OF CORRECTION

| | |
|---|---|
| PATENT NO. | : 7,688,562 B2 |
| APPLICATION NO. | : 11/156095 |
| DATED | : March 30, 2010 |
| INVENTOR(S) | : Marc Bowman |

It is certified that error appears in the above-identified patent and that said Letters Patent is hereby corrected as shown below:

Col. 4, Line 36

Change: "4-20 ma" to read: --4-20 mA--.

Col. 8, Line 25

Change "signal to a" to read: --signal to--.

Signed and Sealed this
Twenty-first Day of February, 2012

David J. Kappos
*Director of the United States Patent and Trademark Office*